A. E. STAFFORD.
METHOD OF MANUFACTURING JOINTING MATERIALS.
APPLICATION FILED NOV. 27, 1918.
1,347,918.
Patented July 27, 1920.
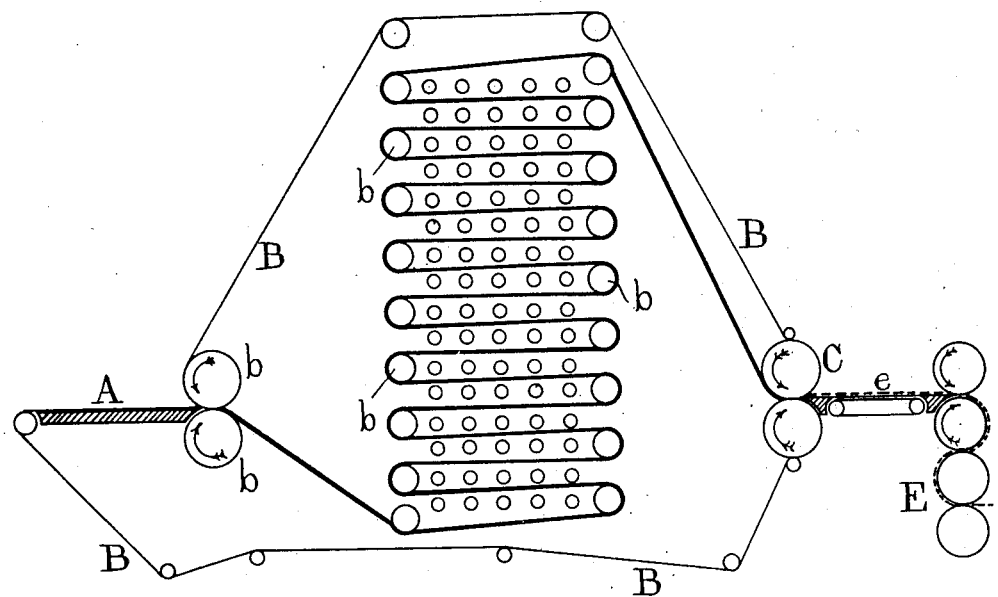
Witnesses
Inventor
Arthur E. Stafford,
by
Attorney

UNITED STATES PATENT OFFICE.

ARTHUR EDWARD STAFFORD, OF ROCHDALE, ENGLAND, ASSIGNOR TO POTTER'S ASBESTOS COMPANY LIMITED, OF ROCHDALE, LANCASTER, ENGLAND.

METHOD OF MANUFACTURING JOINTING MATERIALS.

1,347,918.  Specification of Letters Patent.  Patented July 27, 1920.

Application filed November 27, 1918. Serial No. 264,433.

*To all whom it may concern:*

Be it known that I, ARTHUR EDWARD STAFFORD, a British subject, residing at Rochdale, county of Lancaster, England, have invented certain new and useful Improvements in Methods of Manufacturing Jointing Materials, of which the following is a specification.

This invention relates to the manufacture of jointing material such as is known as high pressure jointing from rubber and asbestos fibers.

This jointing is at present made by applying the material around a single cylinder or roller of the desired diameter in cylindrical form and then cutting it across to form sheets.

The invention is designed to provide a more expeditious method of manufacture and one by which the jointing material can be made in continuous lengths instead of being made in sheets.

It consists essentially in building up the complete material by carrying the soft plastic mixture between endless blankets or conveyer bands while being dried, compressed and consolidated until sufficiently cohesive to be passed forward to calendering and finishing rolls, and it further consists in applying after the material has been dried and consolidated an additional surfacing material automatically to one or both faces as the material is passed through the calendering machine.

The invention will be fully described with reference to the accompanying drawing.

The figure shows a diagrammatic section of apparatus for drying and consolidating the material.

The material A which is of the ordinary composition of rubber and asbestos and in a soft and plastic condition and which may contain between 50 and 75 per cent. of asbestos, about 65 per cent. of asbestos being found preferable, is fed between two endless blankets or canvas sheets or other suitable conveyer sheets B. These bands pass between rollers $b$ which receive and compress the material as it is fed to them between the sheets B which carry the material over suitable heated drying chests or cylinders and to stripping rollers C where it is further consolidated and stripped from the conveyer sheets B.

The material when it is stripped from the conveyer sheets B is passed forward to the calendering rolls E.

As the material passes between the calendering rolls E at one or more points a surfacing material $e$ is fed to one or both surfaces as the material passes between the calendering rolls. This material is of finer or different mixture to that fed in at the front of the machine containing a slightly greater percentage of rubber in order to give a smooth finish and it may contain coloring material to give the desired face to the finished packing material. It is of a consistency and composition to readily adhere to the previously dried and consolidated material.

Some of the subsequent calendering rolls may be heated to drive off any solvents contained in the surfacing material.

What I claim as my invention and desire to protect by Letters Patent is:—

1. The method of manufacturing jointing material in long or continuous lengths which consists in mixing or preparing the composition of rubber and asbestos, feeding the soft plastic mass between two endless conveyer sheets or blankets, carrying it by such sheets over drying chests or plates and between consolidating rolls, stripping it from the conveyer sheets and finally calendering it substantially as described.

2. In a continuous process for manufacturing jointing material applying automatically to the previously dried and consolidated material an additional surfacing material at one or more points as it passes through the calendering rolls substantially as described.

3. A continuous method of manufacturing jointing material consisting in drying and consolidating the base of the material, applying automatically thereto an additional surfacing material at one or more points as it passes through the calendering rolls and finally calendering the surface substantially as described.

4. In the manufacture of jointing material as in claim 3 automatically applying to both faces of the dried and consolidated material a surfacing material of different composition or color substantially as described.

In testimony whereof I have hereunto set my hand, in presence of two subscribing witnesses, this 9th day of November, 1918.

ARTHUR EDWARD STAFFORD.

Witnesses:
   I. Owden O'Brien,
   I. Grimes O'Brien.